United States Patent [19]

Newby

[11] Patent Number: 4,527,353
[45] Date of Patent: Jul. 9, 1985

[54] IRRIGATION/FERTILIZATION CONTROL AND DISTRIBUTION SYSTEM

[76] Inventor: John C. Newby, 41289 Malcolmson St., Fremont, Calif. 94538

[21] Appl. No.: 481,817

[22] Filed: Apr. 4, 1983

[51] Int. Cl.³ ............................................. A01G 31/00
[52] U.S. Cl. ........................................ 47/59; 47/79; 222/54
[58] Field of Search ...................... 47/59, 62, 79, 48.5, 47/9–17, DIG. 4; 137/78.2, 79, 80, 80.1, 251.11; 236/99 R, DIG. 11; 222/54

[56] References Cited

U.S. PATENT DOCUMENTS

| | | | |
|---|---|---|---|
| 2,336,730 | 12/1943 | Hayter | 137/80 |
| 2,965,117 | 12/1960 | Gallacher | 137/78.2 |
| 3,361,359 | 1/1968 | Chapin | 47/48.5 |
| 3,422,833 | 1/1969 | Kitrilakis | 137/78.2 |
| 3,807,088 | 4/1974 | Jones | 47/17 |
| 4,178,716 | 12/1979 | Harper et al. | 47/62 |
| 4,272,919 | 6/1981 | Schmidt | 47/9 |
| 4,304,528 | 12/1981 | Jordan | 137/78.2 |
| 4,310,990 | 1/1982 | Payne | 47/59 |

Primary Examiner—Robert A. Hafer
Assistant Examiner—Daniel Nolan
Attorney, Agent, or Firm—Paul L. Hickman

[57] ABSTRACT

An irrigation and fertilization control/distribution system characterized by a distribution network and a control assembly coupling the distribution network to a pressurized water source. The control assembly includes an on/off valve mechanism operative to supply water to the distribution network when the ambient temperature exceeds a predetermined level, and a fertilizer metering mechanism operative to supply liquid fertilizer to the distribution network on the rising portion of a temperature cycle. The distribution network can include an inclined, hydroponic growth tube and a drip/mist tube.

17 Claims, 5 Drawing Figures

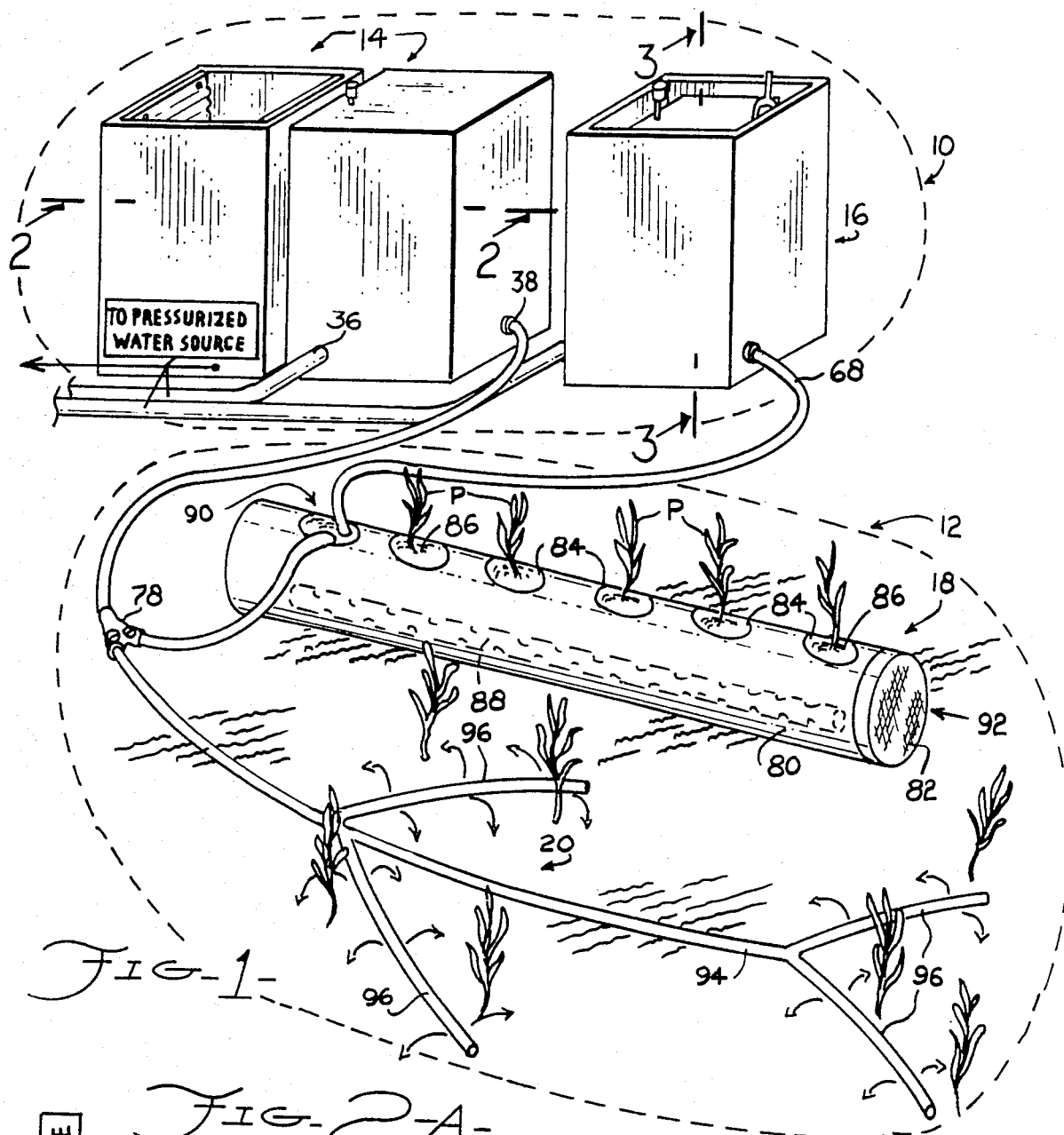
FIG-1-
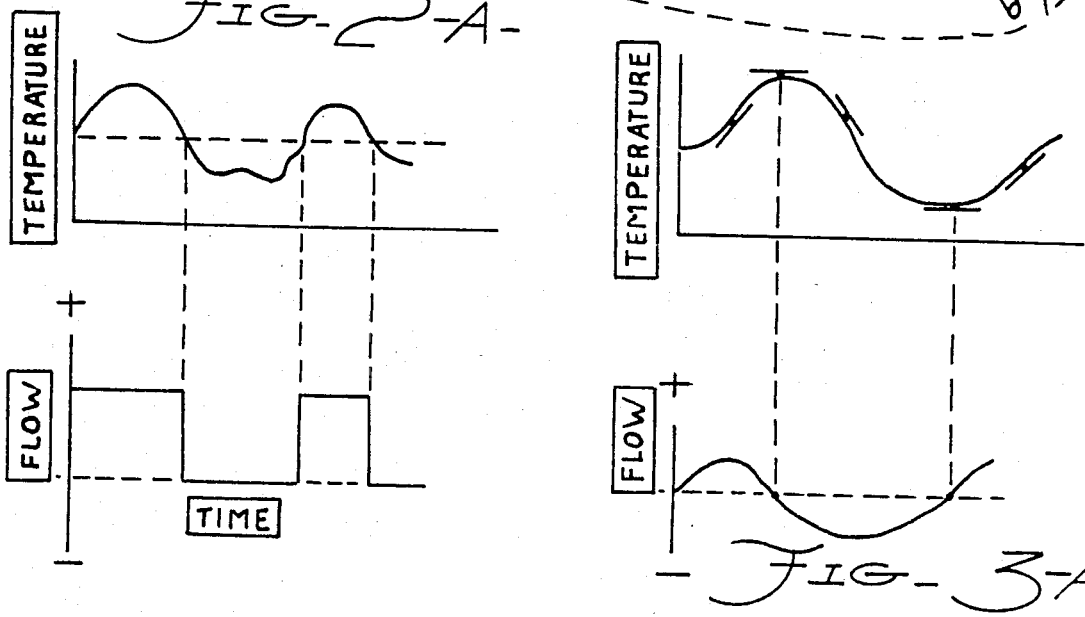
FIG-2A-
FIG-3A-

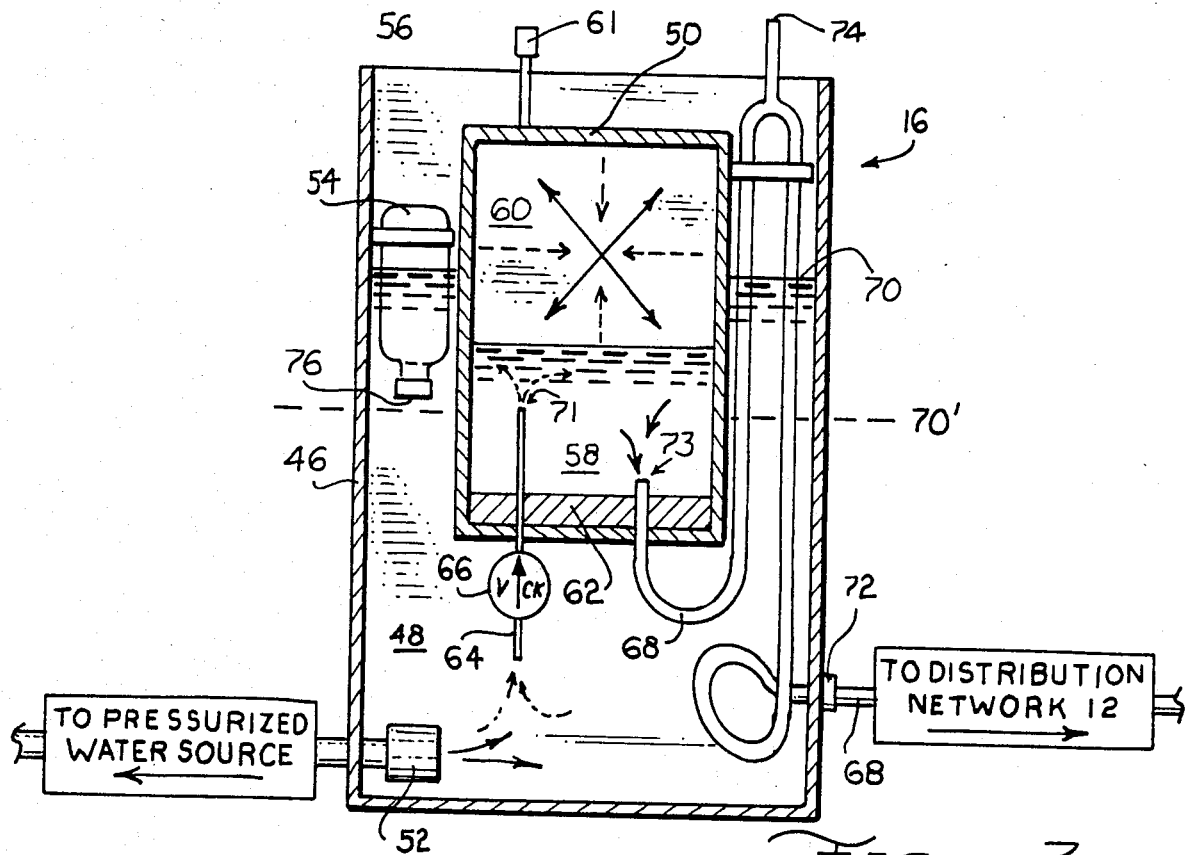
FIG_3_
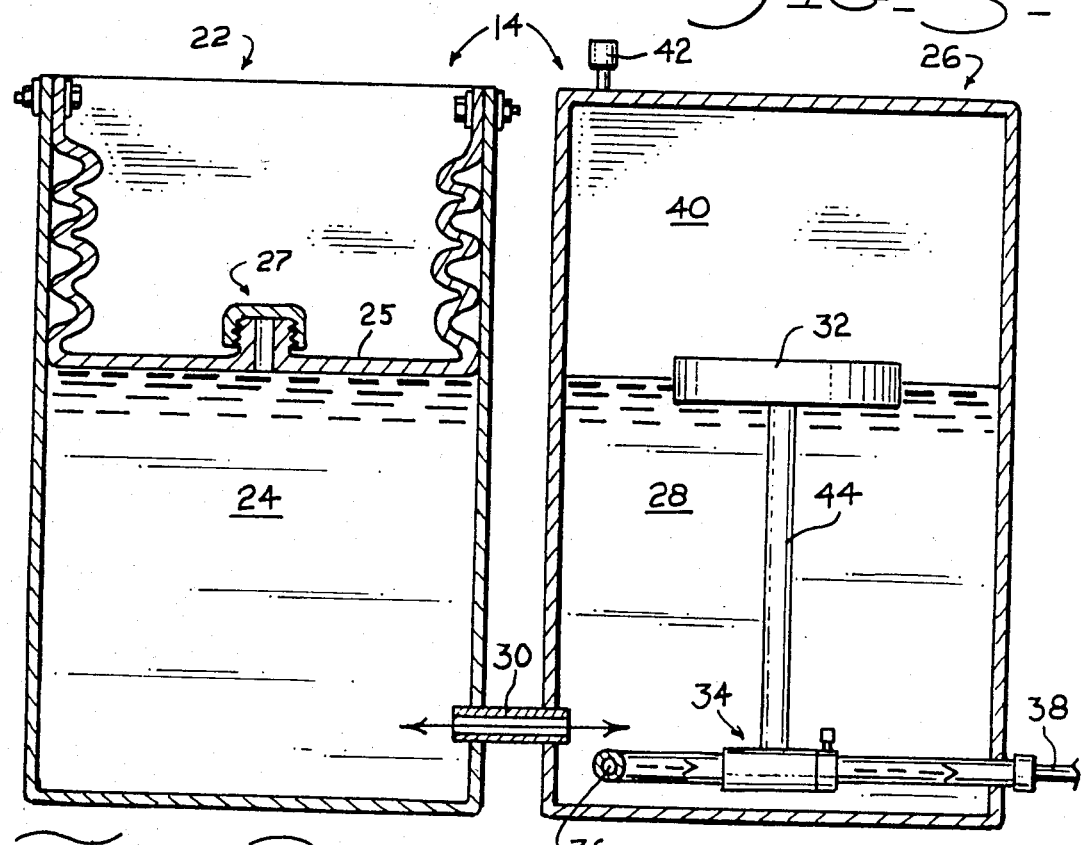
FIG_2_

IRRIGATION/FERTILIZATION CONTROL AND DISTRIBUTION SYSTEM

BACKGROUND OF THE INVENTION

1. Field of the Invention

This invention relates generally to control assemblies and more particularly to automatic control and distribution systems for irrigation and fertilization.

2. Description of the Prior Art

A simple irrigation system that has been in use for centuries includes a network of irrigation ditches that are periodically or continuously flooded with water to bring needed moisture to the plants. This type of irrigation system, while inexpensive, is very wasteful of water resources.

A more modern irrigation system utilizes a pressurized water source, a water distribution network typically including a series of pipes and spray heads, and a control assembly coupling the pressurized water source to the water distribution network. The control assembly can be as simple as a manually operated valve, or as complex as an electronic device responsive to a number of environmental parameters and operative to deliver the optimal amount of moisture to the plants.

While inexpensive, a manually operated irrigation system is inconvenient since it must be constantly monitored. The trend in modern farming and gardening is to replace manually operated systems with sophisticated electromechanical or electronic control assemblies. Besides being costly and maintenance intensive, such assemblies require a power source. Battery powered sources are expensive and must be recharged, and conventional power sources require the stringing of transmission lines.

There has been an increasing interest in hydroponic farming and gardening in recent years. In hydroponic farming, plants grow in a non-nutritive root supporting mass such as sand, pebbles, or vermiculite and are periodically watered and fed with liquid fertilizer. Hydroponic farming has the same irrigation problems as does conventional farming, but with the added complication supplying the proper amount of liquid fertilizer to the plant roots. In consequence, the irrigation/fertilization control and distribution systems for hydroponic farming and gardening are typically much more complex than those for conventional farming, and thus more expensive and maintenance intensive. Again, an external source of power must be supplied to the hydroponic control assemblies known in the prior art.

SUMMARY OF THE INVENTION

An object of this invention is to provide an automatic irrigation/fertilization system which does not require a conventional power source.

A further object of this invention is to provide an irrigation/fertilization system which is demand responsive, i.e. will provide more fertilizer and water as they are needed by the plants.

Another object of this invention is to provide and irrigation/fertilization system particularly adapted for hydroponic gardening.

Yet another object of this invention is to provide an irrigation/fertilization system which has few moving parts, which is relatively inexpensive, and which is easy to maintain.

Briefly, the invention comprises a water valve mechanism responsive to the ambient temperature and operative to couple a water source to a water/fertilizer distribution network, a reservoir of liquid fertilizer, and a metering apparatus responsive to ambient temperature cycles and operative to couple the liquid fertilizer to the water/fertilizer distribution network. The irrigation/fertilization system of this invention is automatic and is activated by the ambient temperature and changes in the ambient temperature.

The water/fertilizer distribution network can include an inclined, hydroponic growth conduit provided with an inlet near an upper end, and an outlet near its lower end. Preferably, a hollow, perforated tube is disposed within the growth conduit and runs substantially its entire length.

The water valve mechanism includes a water reservoir open to the atmospheric pressure, a partially filled water chamber sealed from atmospheric pressure, a tube connecting the water reservoir to the water chamber, a float located within the water chamber, and a valve coupled to the float having an inlet coupled to a pressurized water supply and an outlet coupled to the water/fertilizer distribution network. When the ambient temperature exceeds a predetermined level, air trapped within the water chamber expands, forcing water from the water chamber into the water reservoir and allowing the float to drop to open the valve. As the ambient temperature drops, the air within the water chamber contracts, drawing water back from water reservoir and raising the float to close the valve. Thus, the water valve mechanism of the present invention supplies water to the plants when it is most needed, i.e. when the outside temperature exceeds a predetermined level. The longer the ambient temperature is above the predetermined level, the more water will be supplied to the roots of the plants.

The metering mechanism includes a sealed metering chamber floating on a reservoir of liquid fertilizer, a first conduit permitting liquid fertilizer to flow into to the metering chamber, and a second conduit connecting the metering chamber to the water/fertilizer distribution network. Means are provided to automatically refill the reservoir when the liquid fertilizer drops below below a predetermined level. The metering mechanism is also responsive to the ambient temperature but operates in an analog manner on rising temperature cycles rather than the on/off or digital manner that the water valve mechanism operates in. As the temperature within the metering chamber rises, air trapped therein expands and forces liquid fertilizer out the second conduit. As the temperature drops the air within the metering chamber contracts drawing liquid fertilizer into the metering chamber from the reservoir.

An advantage of this invention is that a control assembly for irrigation/fertilization is disclosed which does not require any external power source.

Another advantage of this invention is that the control assembly is demand responsive in that water and fertilizer are supplied to the plants at times when they are most needed.

Another advantage of this invention is that it contains very few moving parts and this is relatively inexpensive and easy to maintain.

These and other objects and advantages of the present invention will no doubt become apparent upon a reading of the following descriptions and a study of the several figures of the drawing.

BRIEF DESCRIPTION OF THE DRAWING

FIG. 1 is a simplified, perspective view of an irrigation/fertilization control and distribution system in accordance with the present invention.

FIG. 2 is a cross sectional view taken along line 2—2 of FIG. 1.

FIG. 3 is a cross sectional view taken along line 3—3 of FIG. 1.

DETAILED DESCRIPTION OF THE PREFERRED EMBODIMENT(S)

Referring to FIG. 1, an irrigation/fertilization control and distribution system in accordance with the present invention includes a control assembly 10 and a water/fertilizer distribution network 12. Control assembly 10 includes a water valve mechanism 14, and a liquid fertilizer metering mechanism 16. Distribution network 12 includes a hydroponic growth conduit 18 and a drip/mist tube 20.

Referring additionally to the cross sectional view of FIG. 2, water valve mechanism 14 includes a water reservoir 22 open to atmospheric pressure and partially filled with water 24, a vapor barrier 25 provided with a refill 27, a water chamber 26 sealed from atmospheric pressure and partially filled with water 28, a conduit 30 connecting water 24 of chamber 22 to the water 28 contained within chamber 26, a float 32, and a valve mechanism 34. The input 36 to valve 34 is coupled to a pressurized water source, and the output 38 of valve mechanism 34 is coupled to the water/fertilizer distribution network 12.

A pocket of air 40 is trapped within an upper portion of sealed chamber 26. The amount of air trapped within chamber 26 can be varied by an air valve 42. Chamber 26 is preferably constructed from a durable material having a fairly high thermal conductivity.

Vapor barrier 25 is a flexible membrane which rises and falls with the water 24 within reservoir 22. The purpose of barrier 25 is to prevent evaporation of the water 24. Water can be added or removed from reservoir 24 through refill 27 to control operating parameters of the water valve mechanism 14.

Referring additionally to FIG. 2A, the water valve mechanism of the present invention operates as a digital on/off valve responsive to the ambient temperature. As the ambient temperature increases above a predetermined threshold level "T" the air 40 trapped within chamber 26 will expand, forcing water 28 through conduit 30 to mix with water 24 of chamber 22. As the water level within chamber 26 falls, float 32 will drop and, via a connecting rod 44, open valve 34 to allow pressurized water to flow to the water/fertilizer distribution network 12. As the temperature drops below the predetermined threshold temperature "T" the air 40 within chamber 26 contracts to draw water 24 from chamber 22 to mix with water 28 of chamber 26. As float 32 rises, the connecting rod 44 will cause valve 34 to close and thus shut off the flow of water to the water-fertilizer distribution network 12. Thus, the water valve mechanism operates in a digital manner to provide full water flow to the water/fertilizer distribution network 12 when the ambient temperature exceeds the predetermined threshold temperature, and cutting off the water flow to the water/fertilizer distribution network 12 when the temperature drops below the predetermined temperature.

Referring now to FIG. 3, the liquid fertilizer metering mechanism 16 includes a reservoir 46 partially filled with liquid fertilizer 48, a sealed metering chamber 50 floating within reservoir 46, and a reservoir refilling mechanism including a pressure valve 52 and a fertilizer bottle 54. Reservoir 46 is open to atmospheric pressure at 56.

Metering chamber 50 is partially filled with liquid fertilizer 58 and has a trapped pocket of air 60 in its upper volume. The amount of air 60 within metering chamber 50 can be varied through a valve 61. A stabilizing weight 62 is located at the bottom of metering chamber 50, and an intake tube 64 provided with a check valve 66 connects the metering chamber 50 to reservoir 46. An output tube 68 having a greater diameter than inlet tube 64 is looped above surface 70 of liquid fertilizer 48 and then passed through a side wall of reservoir 46 at location 72. Output tube 68 is vented to the atmosphere via a tube 74 and is connected to the water/fertilizer distribution network 12.

Pressure valve 52 is coupled to the pressurized water source and is operative to open when the liquid fertilizer 48 within reservoir 46 drops below a predetermined level shown at 70'. Fertilizer bottle 54 meters a predetermined amount of fertilizer concentrate into reservoir 46 whenever surface level 70 drops below its mouth 76. Thus, the amount of liquid fertilizer 48 within reservoir 46 will always be between a maximum level 70 and a minimum level 70'.

As the air 60 within metering chamber 50 expands due to a rising ambient temperature, the liquid fertilizer 58 within the metering chamber 50 will be forced out of tube 68 to water/fertilizer distribution network 12, while check valve 66 prevents liquid fertilizer 58 from being forced out tube 64 into reservoir 46. If tube 64 has a sufficiently smaller cross sectional diameter than tube 68 the check valve 66 can be eliminated since most of liquid fertilizer 58 will flow out of the larger diametered tube 68. Furthermore, since the upper end 71 of tube 64 is higher than the upper end 73 of tube 68, liquid fertilizer 58 can only flow out tube 68 when its level within chamber 50 is lower than end 71 of tube 64.

As the air 60 contracts due to a falling ambient temperature, it will lose buoyancy and will sink in reservoir 46, allowing liquid fertilizer to flow into the metering chamber 50 through tube 64. A venting tube 74 prevents liquid from being siphoned out of metering chamber 50 through tube 68.

Referring additionally to FIG. 3B, it can be seen that the fertilizer metering mechanism 16 responds to the ambient temperature cycles in an analog manner, as opposed to the digital manner of water valve mechanism 14. To be more precise, metering chamber 50 will meter out liquid fertilizer on an increasing portion of the temperature cycle, and recharge with liquid fertilizer on a decreasing portion of the temperature cycle. When the ambient temperature is constant, liquid fertilizer neither enters or leaves the metering chamber 50. In effect, the amount of liquid fertilizer leaving the metering chamber is proportional to the derivative of the temperature function, as set out below:

$$\text{Metered fertilizer} = K \times (d/dt(T(t)))$$

where $T(t)$ is the temperature function with respect to time.

A side-by-side comparison of FIGS. 2a and 3a demonstrates the difference in the operation of water valve mechanism 14 and fertilizer metering mechanism 16. The water valve mechanism is always open above a predetermined temperature, and always closed below that predetermined temperature. Temperature fluctuations above or below the threshold temperature do not have and effect on the amount of water flowing to the water/fertilizer distribution network 12. On the other hand, fertilizer metering mechanism 16 will meter out fertilizer during any rising temperature curve, regardless of a threshold temperature. During a rising temperature cycle, the amount of fertilizer metered out is an analog function of the derivative of the temperature function.

It should be noted that both the water valve mechanism 14 is responsive to the moisture needs of the plants. When temperatures are high, valve mechanism 14 is always open bringing water to the roots of the plants. When the temperature is low, the water is shut off to prevent potentially damaging overwatering of the plants.

The fertilizer metering mechanism is likewise responsive to the nutritional needs of the plants. Plants do most of their growing during a rising portion of a temperature cycle, which is when the metering device delivers the liquid fertilizer to the plant roots. Plants tend to enter a more dormant stage during the declining portion of a temperature cycle, and during this stage the flow of liquid fertilizer is curtailed.

Referring again to FIG. 1, the output tube 38 of the water valve mechanism is coupled to both growth conduit 18 and drip/mist tube 20 by a "Y" valve 78 which allows the flow to conduit 18 and tube 20 to be independently controlled. Output tube 68 of the fertilizer metering mechanism 16 is coupled to the growth conduit 18 alone.

Growth conduit 18 includes an elongated inclined tube 80 having a lower end covered with a screen 82. A number of apertures 84 are provided in an upper circumferential surface of tube 80 to receive plants "P". The tube 80 is filled with a root support mass 86 such as sand, rocks, pebbles, or vermiculite. A many apertured drainage tube 88 distributes the water and fertilizer down substantially the entire length of the conduit 18, and insures proper drainage. Furthermore, tube 88 helps to aerate the root support mass 86 since air will be forced out of its apertures when it fills with water and fertilizer. Water and fertilizer flowing into an upper end 90 from the control assembly 10 will flow through the root support mass 86 and out the lower end 92.

Drip/mist tube 20 includes a feeder hose 94 and a number of branch hoses 96 extending away from the feeder hose 94. The branch hoses are perforated with a number of holes so as to drip/mist the surrounding plants.

While this invention has been described in terms of a few preferred embodiments, it is contemplated that persons reading the preceding descriptions and studying the drawing will realize various alterations, permutations and modifications thereof. It is therefore intended that the following appended claims be interpreted as including all such alterations, permutations and modifications as fall within the true spirit and scope of the present invention.

What is claimed is:

1. An irrigation/fertilization control and distribution system for use with a pressurized water source, said system comprising:

a water/fertilizer distribution network;

water valve means responsive to the ambient temperature and operative to couple said water source to said water/fertilizer distribution network when said temperature exceeds a predetermined level;

a source of liquid fertilizer contained within a fertilizer reservoir; and metering means responsive to ambient temperature cycles and operative to couple said source of liquid fertilizer to said water/fertilizer distribution network during a portion of said cycle, said metering means including a sealed metering chamber floating in said fertilizer reservoir, a first conduit permitting fluid to flow from said fertilizer reservoir into said metering chamber, and a second conduit permitting fluid to flow out of said metering chamber to said water/fertilizer distribution network.

2. An irrigation/fertilization system as recited in claim 1 wherein said water/fertilizer distribution network includes a growth conduit supported on an incline and provided with a growth conduit inlet proximate an upper end thereof, and provided with a growth conduit outlet proximate a lower end thereof.

3. An irrigation/fertilization system as recited in claim 2 wherein said growth conduit includes an elongated, hollow body, and a water permeable cover for covering at least a portion of said outlet.

4. An irrigation/fertilization system as recited in claim 2 wherein said growth conduit includes a hollow, perforated tube disposed within said hollow body, the length of said tube being a substantial fraction of the length of said body.

5. An irrigation/fertilization system as recited in claim 3 wherein said outlet is an open, lower end of said body, and wherein said permeable cover includes a screen covering at least a portion of said open, lower end.

6. An irrigation/fertilization system as recited in claim 3 wherein said body is at least partially filled with a root supporting mass.

7. An irrigation/fertilization system as recited in claim 1 wherein said water valve means includes a water reservoir open to atmospheric pressure and partially filled with water, a water chamber sealed from atmosphere pressure and partially filled with water, means providing fluid communication between said water reservoir and said water chamber, a float disposed within said water chamber, and valve means coupled to said float and having a valve inlet coupled to said pressurized water source, and a valve outlet coupled to water/fertilizer distribution network, said valve means being operative to couple said valve inlet to said valve outlet when said float drops below a predetermined level.

8. An irrigation/fertilization system as recited in claim 1 wherein said metering means includes means for refilling said fertilizer reservoir when the liquid fertilizer contained therein drops below a predetermined level.

9. An irrigation/fertilization system as recited in claim 8 wherein a portion of said second conduit extends above the surface of said liquid fertilizer and is vented to the atmosphere.

10. An irrigation/fertilization system as recited in claim 9 wherein said first conduit has a smaller cross sectional diameter than said second conduit.

11. An irrigation/fertilization system as recited in claim 10 wherein said first conduit is provided with a check valve.

12. An irrigation/fertilization system as recited in claim 2 further comprising a drip feeder coupled to said water valve means.

13. A water valve as recited in claim 7 further comprising a vapor barrier for inhibiting evaporation from said water reservoir.

14. In a fertilization system, a fertilizer metering device comprising a fertilizer reservoir at least partially filled with liquid fertilizer, a sealed metering chamber floating in said fertilizer reservoir, a first conduit permitting fluid to flow from said fertilizer reservoir into said metering chamber, and a second conduit permitting fluid to flow out of said metering chamber.

15. A fertilizer metering device as recited in claim 14 wherein said metering means includes means for refilling said fertilizer reservoir when said liquid fertilizer drops below a predetermined level.

16. A fertilizer metering device as recited in claim 15 wherein a portion of said second conduit extends above the surface of said liquid fertilizer and is vented to the atmosphere.

17. A fertilizer metering device as recited in claim 16 wherein said first conduit has a smaller cross-sectional diameter than said second conduit, and extends above the level of said second conduit.

* * * * *